(12) United States Patent
Kirsch

(10) Patent No.: US 7,073,039 B2
(45) Date of Patent: Jul. 4, 2006

(54) PROVIDING A REGISTER FILE MEMORY WITH LOCAL ADDRESSING IN A SIMD PARALLEL PROCESSOR

(75) Inventor: Graham Kirsch, Bramley, Tadley (GB)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 10/932,897

(22) Filed: Sep. 2, 2004

(65) Prior Publication Data
US 2005/0024983 A1    Feb. 3, 2005

Related U.S. Application Data

(62) Division of application No. 10/210,579, filed on Jul. 30, 2002, now Pat. No. 6,948,045.

(30) Foreign Application Priority Data
Apr. 22, 2002    (GB) ................................. 0209156.9

(51) Int. Cl.
*G06F 12/00*    (2006.01)
(52) U.S. Cl. .................. 711/167; 711/170; 365/230.01; 365/230.06; 365/230.08
(58) Field of Classification Search ................ 711/167, 711/170; 365/230.01, 230.06, 230.08
See application file for complete search history.

(56) References Cited

U.S. PATENT DOCUMENTS

| | | | |
|---|---|---|---|
| 4,754,394 A | 6/1988 | Brantley, Jr. et al. ....... | 364/200 |
| 4,977,538 A | 12/1990 | Anami et al. .......... | 365/230.03 |
| 5,301,340 A | 4/1994 | Cook .......................... | 395/800 |
| 5,446,856 A | 8/1995 | Baber .......................... | 395/401 |
| 5,513,335 A | 4/1996 | McClure | |
| 5,535,365 A | 7/1996 | Barriuso et al. | |
| 5,574,939 A | 11/1996 | Keckler et al. ............. | 395/800 |
| 5,655,132 A | 8/1997 | Watson | |
| 5,835,971 A | 11/1998 | Ikeda | |
| 5,895,487 A | 4/1999 | Boyd et al. | |
| 5,896,501 A | 4/1999 | Ikeda et al. | |
| 5,898,849 A | 4/1999 | Tran | |
| 5,898,883 A | 4/1999 | Fujii et al. | |
| 5,909,407 A | 6/1999 | Yamamoto et al. .... | 365/230.06 |
| 6,002,635 A | 12/1999 | Matano ................. | 365/230.06 |
| 6,026,047 A | 2/2000 | Ryu et al. ............. | 365/230.06 |
| 6,097,665 A | 8/2000 | Tomishima et al. .... | 365/230.06 |
| 6,219,777 B1 | 4/2001 | Inoue .......................... | 712/23 |

(Continued)

FOREIGN PATENT DOCUMENTS

EP    0 381 940 A1    8/1990

(Continued)

*Primary Examiner*—Brian R. Peugh
(74) *Attorney, Agent, or Firm*—Fish & Neave IP Group Ropes & Gray LLP

(57) ABSTRACT

A degree of local addressing is provided for a processing element array by partitioning a register file memory (e.g., data columns, data rows), and adding a select column or row to be associated with each block. The select column or row allows each processing element to read data from or to write data to a different register file address. Global addressing may also be implemented by reading data from or writing data to the same register file address for each processing element. The invention provides the advantage of faster overall execution time. In addition, there is minimal additional area overhead because of the need to pitch match the processing element array to a main memory.

54 Claims, 15 Drawing Sheets

U.S. PATENT DOCUMENTS

| | | |
|---|---|---|
| 6,292,826 B1 | 9/2001 | Zaifman et al. |
| 6,351,795 B1 | 2/2002 | Hagersten |
| 6,393,530 B1 * | 5/2002 | Greim et al. ............... 711/147 |
| 6,456,628 B1 * | 9/2002 | Greim et al. ............... 370/466 |
| 6,678,801 B1 * | 1/2004 | Greim et al. ............... 711/148 |
| 2002/0042868 A1 | 4/2002 | Godtland et al. |

FOREIGN PATENT DOCUMENTS

| | | |
|---|---|---|
| EP | 0 320 607 B1 | 1/1995 |
| EP | 0 797 211 A1 | 9/1997 |
| EP | 0 817 076 A1 | 1/1998 |
| EP | 0 288 774 A3 | 11/1998 |
| GB | 2 165 975 A | 4/1986 |

* cited by examiner

PROVIDING A REGISTER FILE MEMORY WITH LOCAL ADDRESSING IN A SIMD PARALLEL PROCESSOR

CROSS-REFERENCE TO RELATED APPLICATION

This is a division of, commonly-assigned U.S. patent application Ser. No. 10/210,579, now U.S. Pat. No. 6,948,045 filed Jul. 30, 2002, which claims priority from British Patent Application No. 0209156.9, filed Apr. 22, 2002.

BACKGROUND OF THE INVENTION

This invention relates to local addressing for a register file memory. More particularly, this invention relates to local addressing for a register file memory in a single instruction multiple data (SIMD) parallel processor.

A basic computer generally includes a central processing unit (CPU) and a main memory. The CPU implements a sequence of operations encoded in a stored program. The program and data on which the CPU acts is typically stored in the main memory. The processing of the program and the allocation of main memory and other resources are controlled by an operating system. In operating systems where multiple applications may share and partition resources, the computer's processing performance can be improved by partitioning main memory and developing active memory.

Active memory is memory that processes data as well as stores data. It can be told to operate on its contents without transferring those contents to the CPU or to any other part of the system. This is typically achieved by distributing parallel processors throughout the memory. Each parallel processor is connected to the memory and operates on its own block of the memory independently of the other blocks. Most of the data processing is performed within the active memory and the work of the CPU is reduced to the operating system tasks of scheduling processes and allocating system resources and time.

A block of active memory typically consists of the following: a block of memory (e.g., dynamic random access memory (DRAM)), an interconnection block, and a memory processor (processing element array). The interconnection block provides a path that allows data to flow between the block of memory and the processing element array. The processing element array typically includes multiple identical processing elements controlled by a sequencer. Processing elements are generally small in area, have a low degree of hardware complexity, and are quick to implement, which leads to increased optimization. Processing elements are usually designed to balance performance and cost. A simple more general-purpose processing element will result in a higher level of performance than a more complex processing element because it can be easily copied to generate many identical processing elements. Further, because of its simplicity, the processing element will clock at a faster rate.

A system in which numerous identical processing elements (e.g., in the hundreds or thousands) operate under the control of a single sequencer and are closely connected to memory is known as a single instruction multiple data (SIMD) parallel processor. Memory is generally partitioned so that each processing element has access to its own block of the memory. As a result, all processing elements can execute the same instruction concurrently on different pieces of data.

Each processing element has a certain amount of local autonomy that allows each processing element to make data dependent decisions. With early SIMD parallel processors, each processing element can determine whether to write a result to its particular block of memory. With an 8-bit SIMD parallel processor, additional locally-enabled functions have been permitted, including conditional shifting and result selection within each processing element. These additional locally enabled functions are particularly useful for operations such as floating point arithmetic and multiplies.

Other SIMD parallel processors have also allowed a more complex and powerful form of local autonomy: the ability of each processing element to generate its own local memory or register file address. There are penalties associated with this form of local autonomy. For instance, a locally addressed access to memory is generally slower than a global centrally addressed access. However, the access time penalty can be minimal compared to the savings in the overall execution time of a program. Another penalty for implementing local addressing is the additional hardware needed for each processing element to generate and deliver an address to its own block of memory. The area and cost overhead is typically very high and thus many SIMD parallel processors do not implement local addressing.

In view of the foregoing, it would be desirable to provide a register file memory with partial local addressing while minimizing the increase in hardware complexity and cost.

SUMMARY OF THE INVENTION

In accordance with this invention a register file memory with partial local addressing is provided that minimizes the increase in hardware complexity and cost. A single instruction multiple data (SIMD) array (e.g., a processing element array) can be integrated with a main memory, typically dynamic random access memory (DRAM), on a single chip. A simple SIMD array can be divided into the following: a register file memory, one or more processing elements, a control logic sequencer, an interconnect, and a memory buffer register. The register file memory is preferably implemented using static random access memory (SRAM) because SRAM is more area efficient for large memories compared to other types of memory. Two major area overheads for the register file SRAM are (1) decode logic and (2) read logic and sense amplifiers (RLSAs). Decode logic decodes an address in the register file SRAM. RLSAs provide a method of reading data from or writing data to the decoded address. Each processing element processes data from its own block of the register file SRAM. The control logic sequencer can direct the processing of data in each processing element and control data flow between processing elements via the interconnect. The control logic sequencer can also direct the transfer of data between each processing element and a partitioned block of DRAM via memory buffer registers. Data may flow from each block of DRAM to the SIMD array via data paths.

To minimize the hardware complexity and cost associated with full local addressing, partial local addressing is implemented for the register file SRAM. Instead of allocating a unique register file SRAM (e.g., an 8-bit wide SRAM) for each processing element, multiple processing elements (e.g., 8) can be assigned to a register file SRAM (e.g., a 64-bit wide SRAM). Because the decode logic and RLSAs are roughly constant in size in one-dimension regardless of the depth and width of the register file SRAM, this generally results in less area overhead for the 64-bit wide SRAM compared to its equivalent of eight 8-bit wide SRAMs.

The register file SRAM may be provided in different sizes and can be organized in multiple ways. In one embodiment, for example, an SRAM may be partitioned into multiple data columns, where each data column containing rows of data cells is provided for each processing element. In another embodiment an SRAM may be partitioned into multiple data rows, where each data row containing columns of data cells is provided for each processing element. In yet another embodiment, an SRAM may be partitioned into multiple data columns with multiple data rows, where each block provides data for each processing element. Although the register file memory may be organized in a number of ways, the register file memory is primarily described herein as being organized in data columns for clarity.

For a register file memory that is organized in data columns, each data column may include groups of one or more bit columns that each provide one data bit to a processing element. Where there is more than one bit column for each processing element bit, there may be more than one register file address associated with each row of data cells in each data column. For reads, a multiplexer may be provided in RLSAs to select data from the selected row of data cells to be read. For writes, a demultiplexer may be provided in RLSAs to select from the selected row of data cells to be written.

In accordance with one embodiment of the invention, each data column is provided with an additional select column of select cells, where each select cell is associated with a row of data cells in a corresponding data column. Each select cell can have two inputs: a master row select line and a select cell write line. The master row select line is coupled to an output of an address decoder (i.e., row decoder) and corresponds to a register file address of the associated row of data cells across each data column. The select cell write line is coupled to a corresponding processing element and is connected to each select cell in a corresponding select column. A select cell reads the value driven on a corresponding master row select line when a corresponding select cell write line is set to binary "1." Combinatorial logic may be used to perform a logical sum or logical product on a master row select line and a corresponding select cell. The result is then output onto a secondary row select line that extends into a corresponding row of data cells in a corresponding data column. For example, the combinatorial logic may be a two-input AND gate. When both inputs are binary "1," data is read from or written to the selected row of data cells in the selected data column.

Local addressing allows data to be read from or data to be written to different register file addresses for different processing elements (i.e., different rows of data cells for different data, columns, different columns of data cells for different data rows). In a first stage, an address may be presented to a decoder. Each processing element associated with that address drives a corresponding select cell write line with a binary "1," while other processing elements associated with a different address drive a corresponding select cell write line with a binary "0." The decoded address is driven across the master row select lines and each select column with a corresponding select cell write line of "1" writes their select cells with a value on a corresponding master row select line. In a second stage, if another address is available for other processing elements, the select cells associated with those processing elements are written using the same approach as described for the first stage. This is repeated until all the select columns have been written (i.e., all the addresses have been decoded). Once all the addresses have been decoded, binary "1's" are driven across each master row select line. The row of data cells in each data column that has a corresponding select cell of binary "1" is selected to be read or to be written.

To perform a read, data from each data cell in the selected row in each data column is sent along individual bit lines to RLSAs. When more than one bit column provides one data bit to a processing element, data from the selected row for each of these bit columns are sent to a multiplexer. A select bit selects the bit line from which data is to be sent to a corresponding processing element.

To perform a write, each bit from each processing element is sent to RLSAs. When more than one bit column is associated with one data bit of a processing element, each bit is sent to a demultiplexer. A select bit selects which bit line to send the data to. The data is then written to the selected data cell in the selected row.

Successive memory reads or writes may be implemented when multiple bit columns are associated with one data bit of a processing element. Once a row of data cells in each data column is selected, a read or write may be performed using a select bit to select the data cells from which data is to be read or to which data is to be written. An offset may be added to the select bit to select a successive memory location (i.e., a different data cell in the same row) from which data is to be read or to which data is to be written.

After the locally addressed access is complete, all the select cells are reset to "1" to enable global addressing mode. In global addressing mode, one register file address is typically used to access the same row of data cells for each data column. An address is presented to a decoder and the decoded address is driven across the master row select lines. Data is read from or written to the selected row of data cells in each column.

Because the register file SRAMs have separate write enables for each byte, there may already be a degree of byte-wise organization in them. While there may be some overhead in adding the extra bit column to each data column, the additional degree of buffering provided may reduce the area of the decoder by a small amount. Therefore, a register file SRAM with partial local addressing may only have an area slightly larger than the area of a register file SRAM without local addressing.

The SIMD array and memory is typically integrated onto a single chip using a layout design. Because of the need to pitch match (a method of layout that minimizes the routing of wire connections between components) the SIMD array to the DRAM, the layout of the system typically contains extra space between the bytes. Thus, the additional bits cells and logic may be added within the extra spaces, resulting in little or no area overhead.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
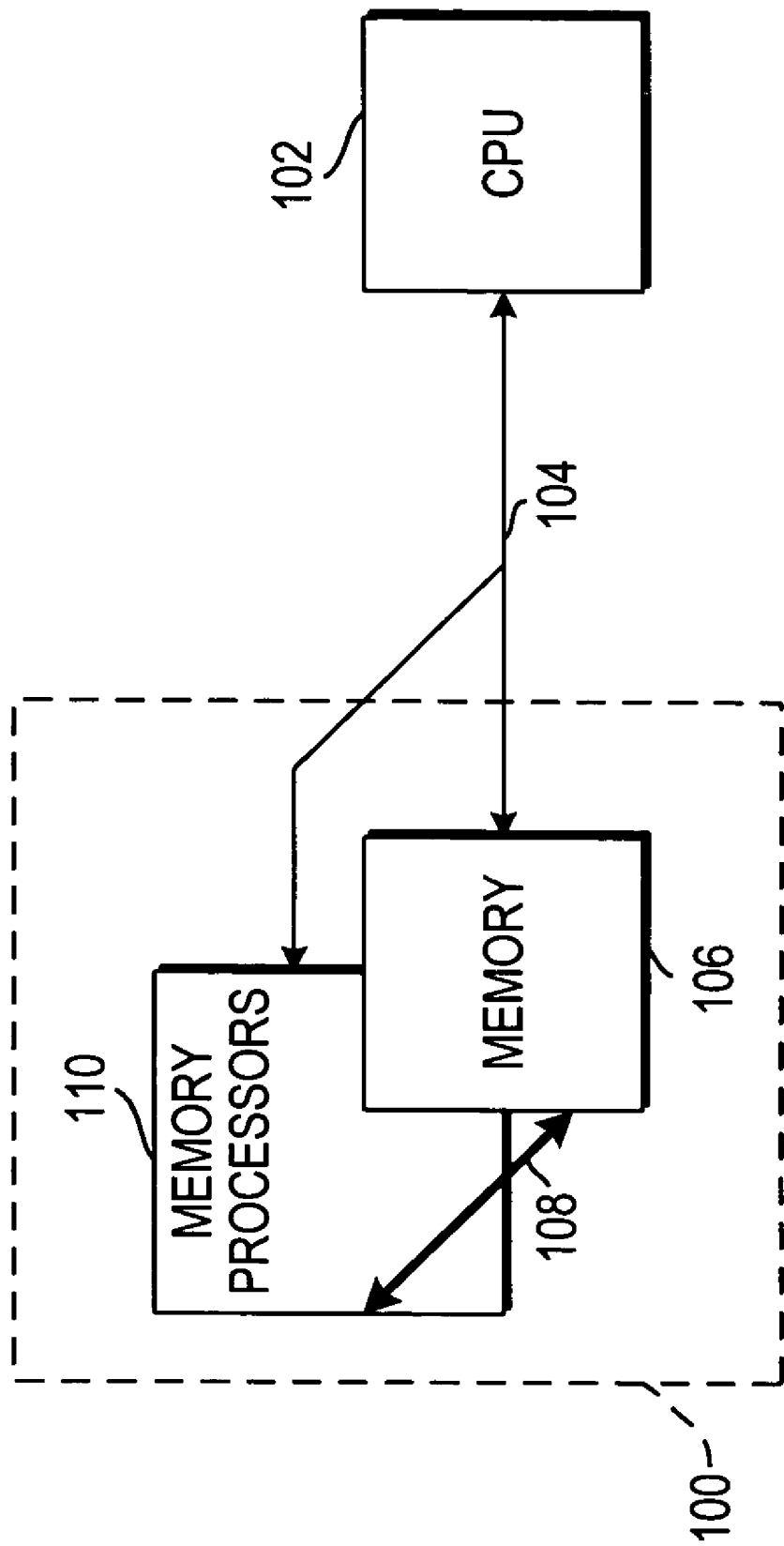
FIG. 1 is a system diagram illustrating one embodiment of an active memory block in accordance with the invention.

FIG. 1 illustrates one embodiment of an active memory block in accordance with the invention. Active memory block 100 can include a memory 106 and memory processors 110. Memory 106 is preferably random access memory (RAM), in particular dynamic RAM (DRAM). Memory processors 110, which include processing element (PE) arrays, can communicate with memory 106 via an interconnection block 108. Interconnection block 108 can be any suitable communications path, such as a bi-directional high memory bandwidth path. A central processing unit (CPU) 102 can communicate with active memory block 100 via a communications path 104. Communications path 104 may be any suitable bi-directional path capable of transmitting data.

Figure 2:
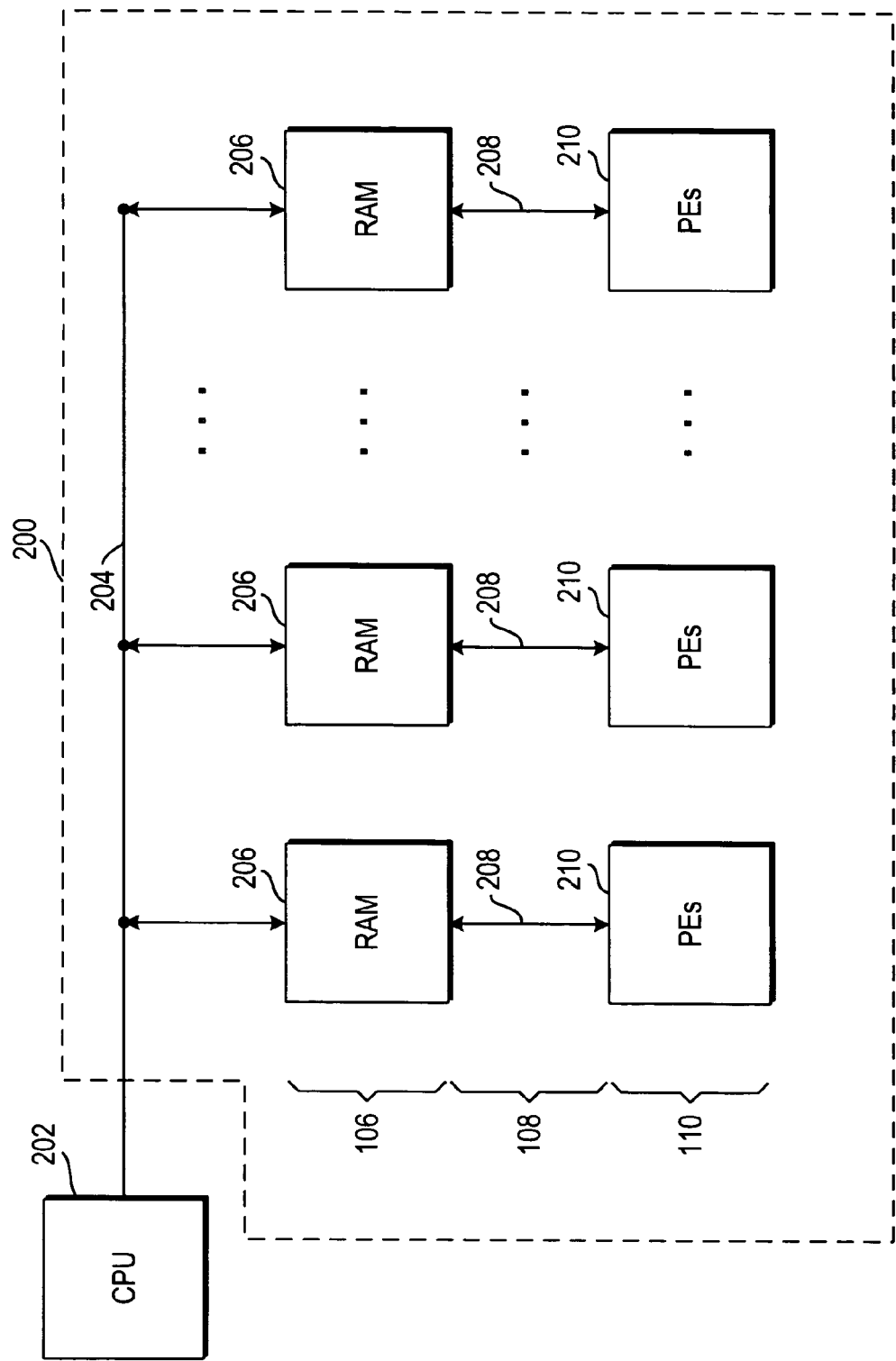
FIG. 2 is a system diagram illustrating one embodiment of a partitioned active memory block in accordance with the invention.

FIG. 2 illustrates one embodiment of a partitioned active memory block 200 in accordance with the invention. A unique range of memory addresses may be allocated to each processing element array 210, thereby allowing each processing element array 210 to operate on its own partitioned block of memory 206 independently of the other blocks. In a single instruction multiple data (SIMD) processor, a CPU 202 can communicate with partitioned blocks of memory 206 via a communications path 204. Each partitioned block of memory 206 may communicate with its corresponding processing element array 210 via an interconnection path 208. Each partitioned block of memory 206, interconnection path 208, and processing element array 210 may be part of memory 106, interconnection block 108, and memory processors 110, respectively. Paths 204 and 208 can be any suitable bi-directional path capable of transmitting data, such as a data bus or a high bandwidth data path.

Figure 3:
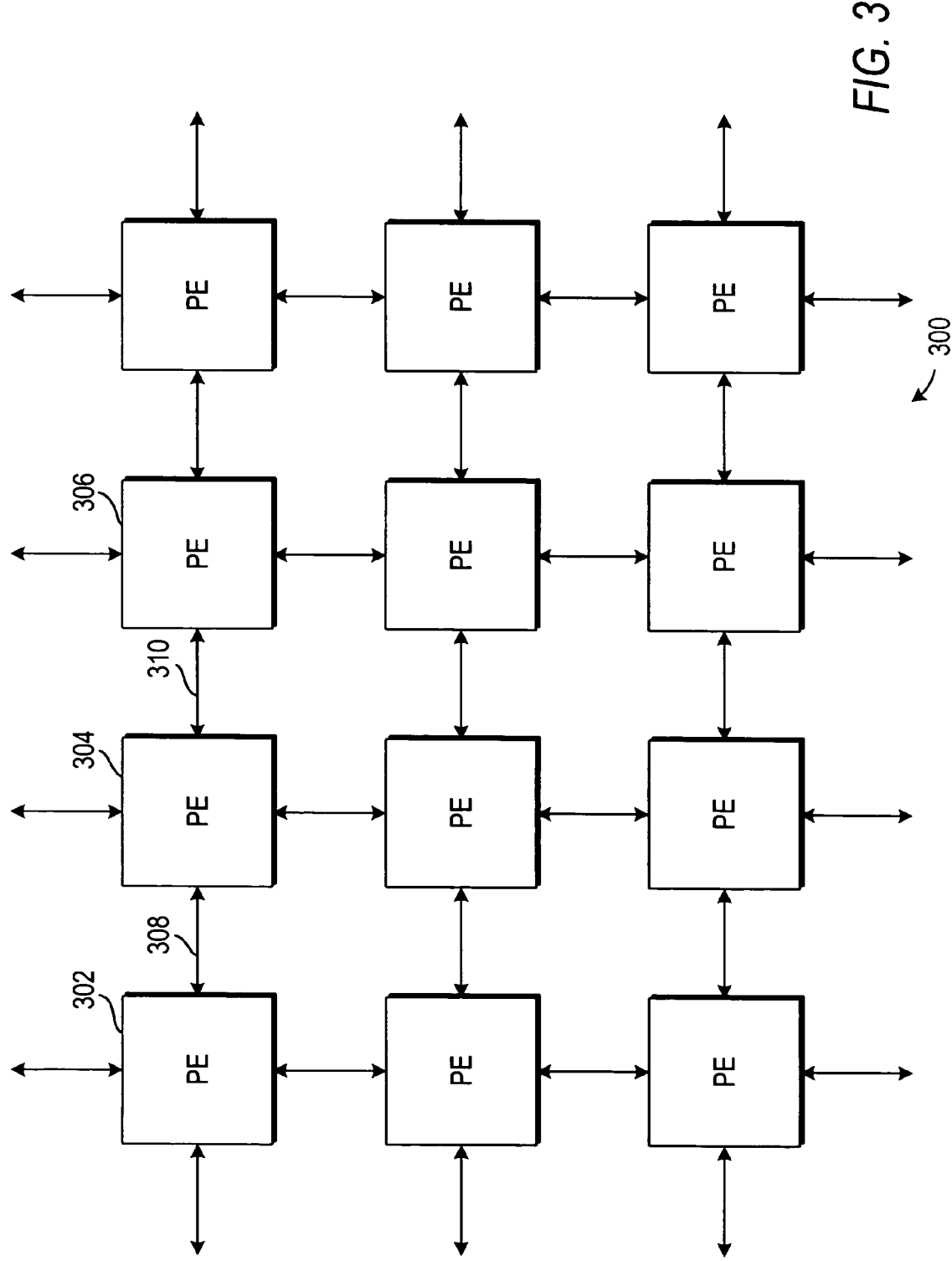
FIG. 3 is a diagram illustrating one embodiment of a two-dimensional processing element array interconnect in accordance with the invention.

FIG. 3 is a diagram illustrating one embodiment of a two-dimensional processing element array interconnect 300 in accordance with the invention. Each processing element array 210 typically includes multiple identical processing elements in which each processing element executes the same instruction concurrently on different pieces of data. Each processing element may be designed to accept and process a number of bits (e.g., 8 bits). Each processing element (e.g., 302, 304, 306) may send data to or receive data from a neighboring processing element via an interconnect cell (e.g., 308 and 310). The interconnect cell may include a simple network of wires to transfer data between processing elements using a shift instruction. The number of wires may equal the number of processing element bits (e.g., 8). Preferably, each processing element simultaneously drives its register value out on an interconnection cell while loading another register value from another interconnection cell. For example, processing element 304 may drive its register value onto interconnect cell 310 to send to processing element 306. At substantially the same time, processing element 304 may load a register value from processing element 302 via interconnect cell 308. In addition to allowing the transfer of data between processing elements in the same processing element array 210, data can flow between processing elements in different processing element arrays 210.

Figure 4:
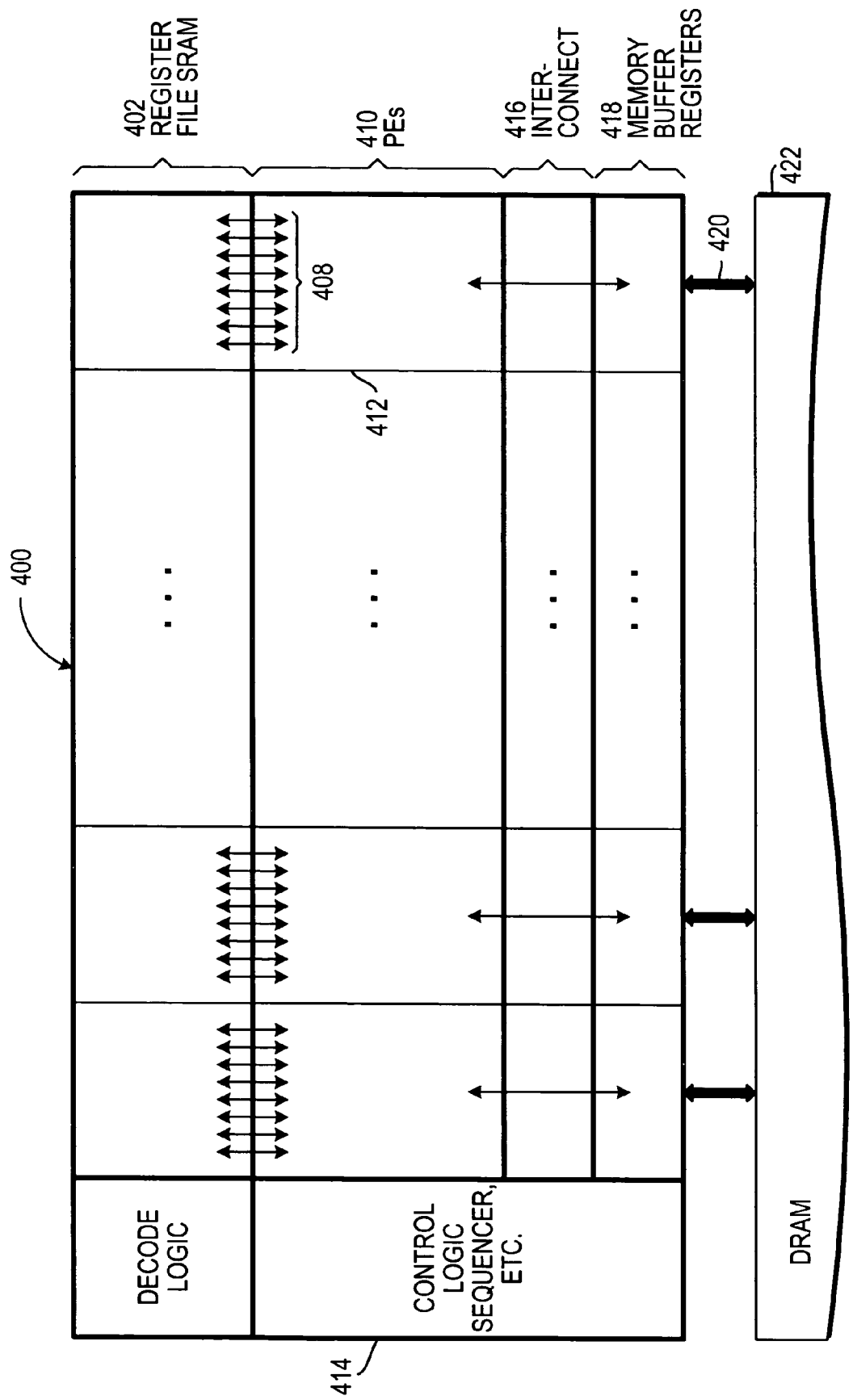
FIG. 4 is a diagram illustrating one embodiment of an SIMD array connected to a DRAM in accordance with the invention.

A processing element array 210 that contains numerous processing elements (e.g., in the hundreds or thousands) is known as a single instruction multiple data (SIMD) array. An SIMD array is preferably integrated with a partitioned block of memory 206, typically dynamic random access memory (DRAM), on a single chip. FIG. 4 illustrates one embodiment of a SIMD array 400 connected to a block of DRAM 422 in accordance with the invention. A SIMD array can be divided into the following: a register file memory 402, one or more processing elements 410, a control logic sequencer 414, an interconnect 416, and a memory buffer register 418. Although register file memory 402 can be implemented using any suitable type of memory (e.g., static random access memory (SRAM), latch array, DRAM), register file memory 402 is preferably implemented using SRAM because it is more area efficient for large memories compared to the other types of memory. Memory 422 and register file memory 402 are described herein in the context of DRAM and SRAM, respectively, for clarity and specificity. However, various embodiments of this invention may be implemented using different types of memory.

Register file SRAM 402 includes (1) decode logic, (2) an SRAM cell array, and (3) read logic and sense amplifiers (RLSAs). The SRAM cell array may be provided in different sizes and organized in multiple ways. In one embodiment, for example, the SRAM cell array may be partitioned into multiple data columns, where each data column is uniquely associated with each processing element. In another embodiment the SRAM cell array may be partitioned into multiple data rows, where each data row is uniquely associated with each processing element. In yet another embodiment, the SRAM cell array may be partitioned into multiple data columns with multiple data rows, where each block is uniquely associated with each processing element. Although the SRAM cell array may be organized in a number of ways, the SRAM cell array is primarily described herein as being organized in data columns for clarity and specificity.

Two major area overheads for the register file SRAM are the decode logic and RLSAs. Regardless of the depth (e.g., 64-location, 128 location) or width (e.g., 8-bit wide, 64-bit wide) of the register file SRAM, the decode logic and RLSAs are roughly constant in size in one-dimension. Decode logic, which may be in the form of a decoder (e.g., an address decoder such as a row decoder or a column decoder), takes as input an address that uniquely maps to one of its multiple outputs. For an SRAM cell array organized in data column, this output is used to access a row of data cells in the SRAM cell array. For example, a decoder with n input bits can map to $2^n$ output bits, thereby allowing a large number of addresses ($2^n$) to be represented using a fewer number of bits (n). RLSAs provide a method of reading data from or writing data to the decoded address. RLSAs detect a signal from the SRAM cell array and amplify that signal before sending data along data paths 408 to each processing element 412. RLSAs also detect a signal from each processing element 412 via data paths 408 and amplify that signal before writing data to the SRAM cell array. Each processing element 412 reads data from or writes data to its corresponding block of the SRAM cell array.

Control logic sequencer 414 preferably includes a (1) processing element control sequencer (PECS) and (2) memory and interconnect sequencer (MIS). PECS can direct the processing of data in processing elements 412. It can also generate a register file address from which data is to be read or to which data is to be written. MIS can control data flow between each processing element 412 and between processing elements 410 and DRAM 422. For example, MIS can direct the loading of data from each processing element 412 onto interconnect 416 (which can be part of interconnection block 108 (FIG. 1)) for transfer to a neighboring processing element 412. MIS can also direct the loading of data from each processing element 412 onto memory buffer registers 418 for transfer to a partitioned block of DRAM 422 via a corresponding data path 420. Similarly, MIS can direct the loading of data from partitioned block of DRAM 422 via a corresponding data path 420 onto memory buffer registers 418 for transfer to a corresponding processing element 412.

Figure 5:
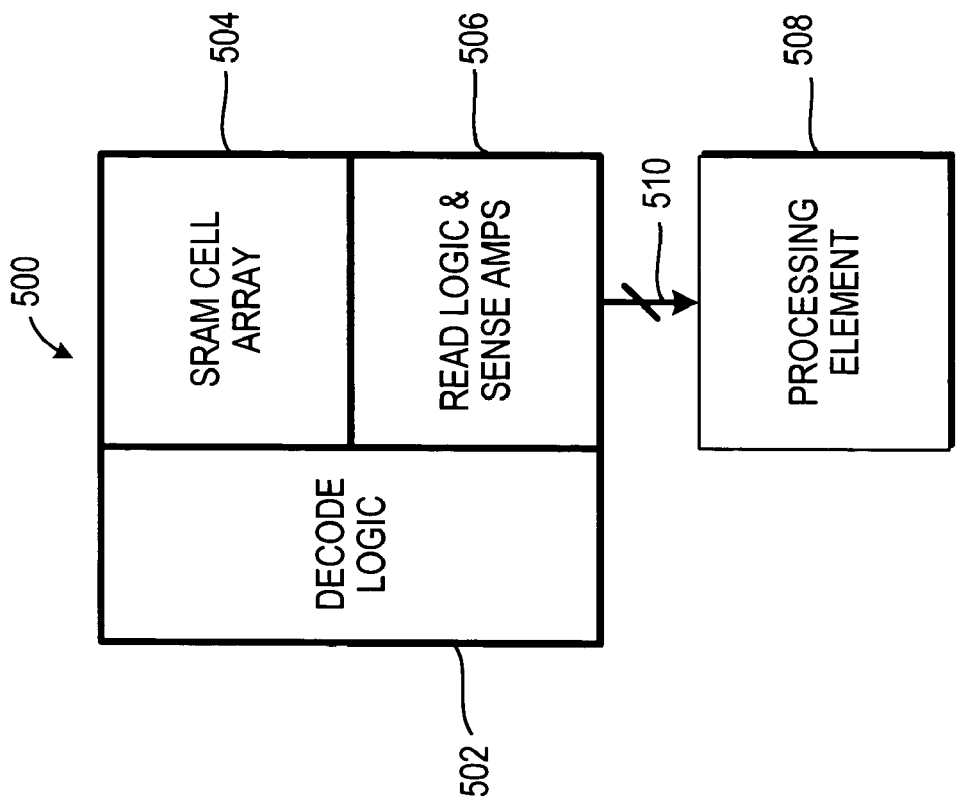
FIG. 5 is a diagram illustrating one embodiment of a register file SRAM dedicated to a processing element.

FIG. 5 illustrates one embodiment of a register file SRAM 500 dedicated to one processing element 508 to provide full local addressing. Register file SRAM 500 includes decode logic 502, an SRAM cell array 504, and RLSAs 506. For reads, data can flow from register file SRAM 500 to processing element 508 via a data path 510. Although not shown, for writes, data can flow from processing element 508 to register file SRAM 500 via data path 510 (a bi-directional data path) or via a separate data path. Processing element 508 may be any suitable size, although processing element 508 is typically eight bits wide. A register file SRAM 500 that provides data to an 8-bit wide processing element 508 is known as an 8-bit wide register file SRAM.

There are multiple approaches to organizing SRAM cell array 504 in register file SRAM 500. FIGS. 6–9 illustrate several different embodiments of an 8-bit wide register file SRAM organized into data columns. Although FIGS. 6–9 only illustrate the SRAM cell array and RLSAs, the decode logic is also a part of the register file SRAM. Furthermore, although the data path between the register file SRAM and the processing element is shown in only one direction (for reads), data can flow in both directions (for reads and writes). Reads can occur via the same data path (e.g., using a bi-directional data path) or via different data paths (e.g., using two unidirectional data paths).

SRAM cell array 504 comprises of one or more data columns containing rows and columns of data cells, where each data cell contains one data bit. Each data column is preferably associated with one processing element. The width of each data column can be any suitable size. For an 8-bit wide processing element, the width of SRAM cell array 504 is preferably a power of two (e.g., 8 bits, 16 bits, 32 bits, 64 bits, etc.). Because a decoder will have a number of outputs equal to a power of two ($2^n$), to maximize the organization of SRAM cell array 504, the depth of each data column is preferably a power of two and equal to a number of decoder outputs (e.g., 64 bits, 128 bits, etc.). The width and depth of each data column are preferably the same.

Figure 6:
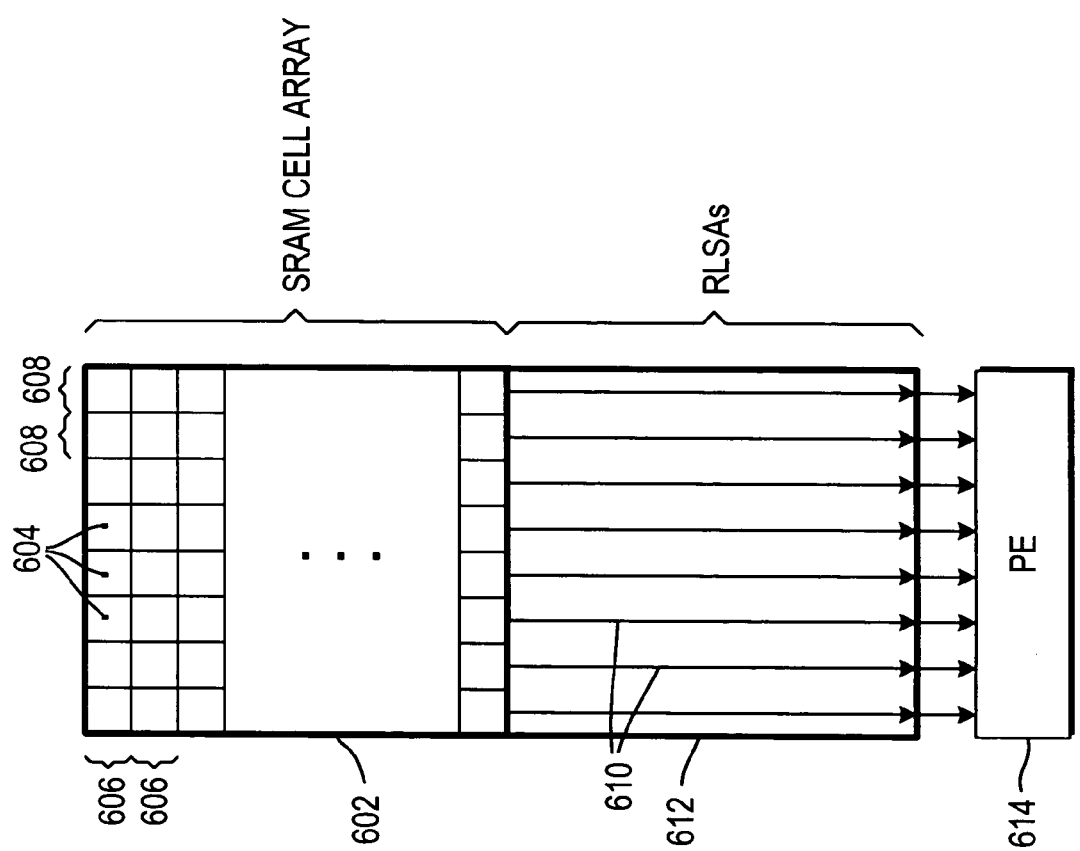
FIG. 6 is a partial diagram illustrating one embodiment of an 8-bit wide register file SRAM.

FIG. 6 illustrates an 8-bit wide register file SRAM with an 8-bit wide data column 602. Each bit column 608 provides one data bit to processing element 614. Each row 606 contains eight data cells 604. When a decoder maps an input address to a unique output, one row 606 is selected. Data in each data cell 604 in the selected row 606 is sent along bit lines 610 to RLSAs 612 where the data is amplified. The data is then sent to processing element 614.

Figure 7:
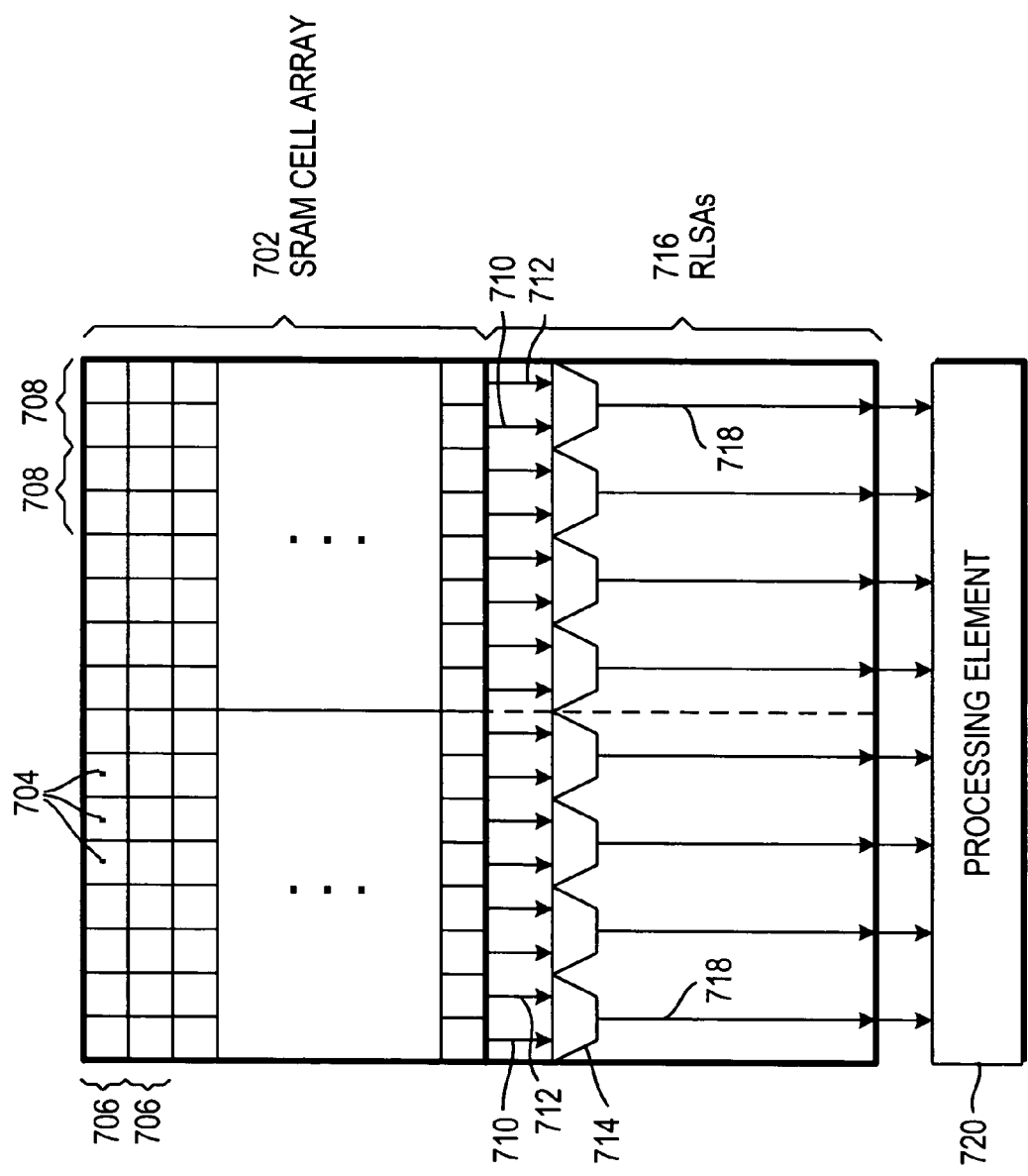
FIG. 7 is a partial diagram illustrating another embodiment of an 8-bit wide register file SRAM.

FIG. 7 illustrates an 8-bit wide register file SRAM with a 16-bit wide data column 702. Each pair of bit columns 708 provides one data bit to processing element 720. Each row 706 contains sixteen data cells 704. A decoder selects a row 706 from which data is to be read or to which data is to be written. For reads, data in each data cell 704 in the selected row 706 is sent along one of bit lines 710 and 712 to a 2:1 (2 input:1 output) multiplexer 714 in RLSAs 716. For example, for each pair of data cells in each pair of bit columns 708, data in the left-hand data cell may be sent along bit line 710 and data in the right-hand data cell may be sent along bit line 712. A select bit may select data from one of bit lines 710 and 712 to send to output path 718. The select bit is preferably the same for each multiplexer 714 (e.g., data is selected from bit lines 710). Data sent to each output path 718 is sent to processing element 720. For writes, each bit from processing element 720 is sent to a 1:2 (1 input:2 outputs) demultiplexer (not shown) in RLSAs 716. Each demultiplexer, has a select bit which selects one of two data cells 704 in the selected row 706 in each pair of bit columns 708 to which data is to be written.

Figure 8:
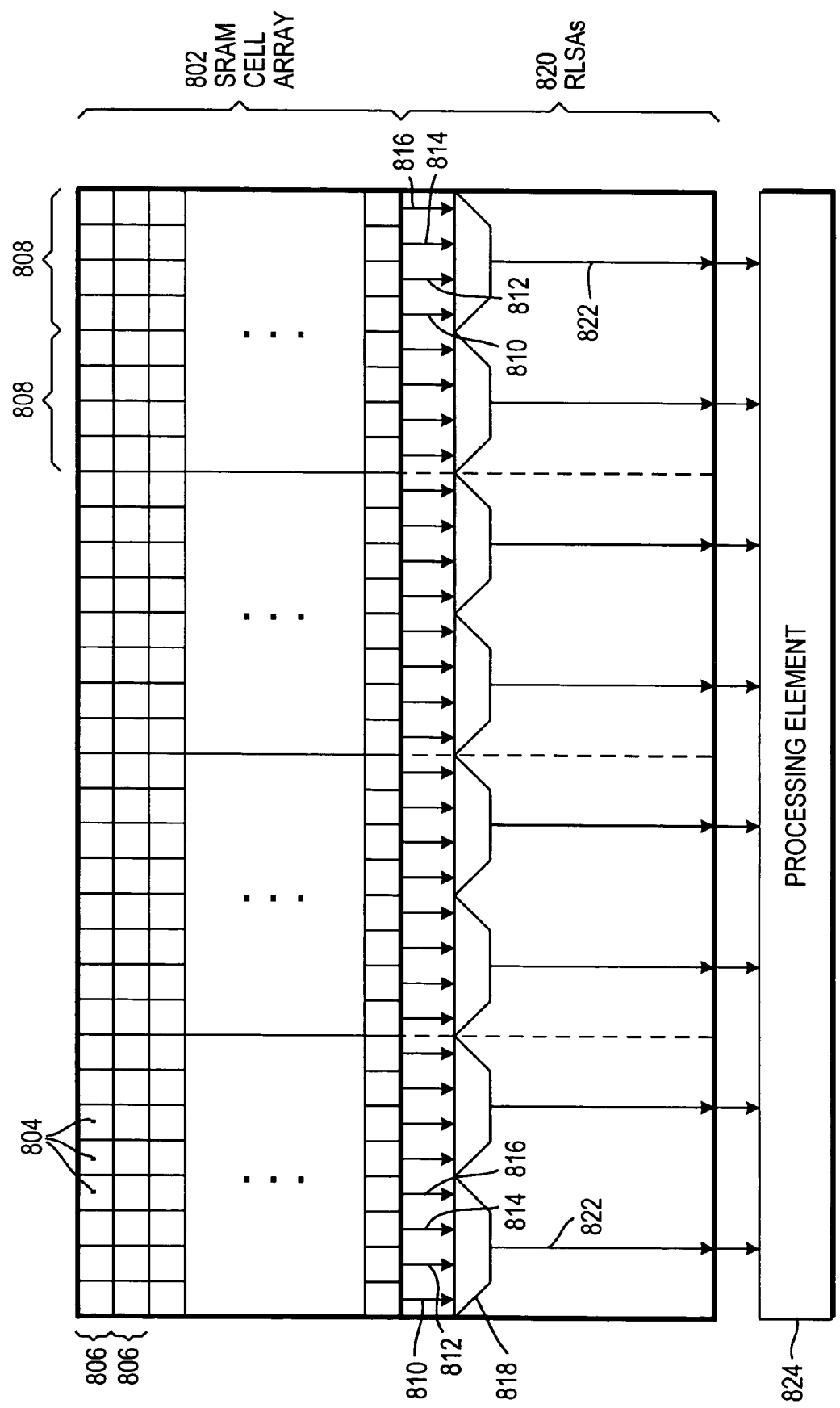
FIG. 8 is a partial diagram illustrating a further embodiment of an 8-bit wide register file SRAM.

FIG. 8 illustrates an 8-bit wide register file SRAM with a 32-bit wide data column 802. Each group of four bit columns 808 provides one data bit to processing element 824. Each row 806 contains thirty-two data cells 804. A decoder selects a row 806 from which data is to be read or to which data is to be written. For reads, data in each data cell 804 in the selected row 806 is sent along one of bit lines 810, 812, 814, and 816 to a 4:1 (4 input:1 output) multiplexer 818 in RLSAs 820. For example, for each group of four bit columns 808, each bit column is associated with a different bit line (810, 812, 814, and 816). A select bit may select data from one of bit lines 810, 812, 814, and 816 to send to output path 822. The select bit is the same for each multiplexer 818 (e.g., data is selected from bit line 810). The data sent to each output path 822 is sent to processing element 824. Similar to writes described in connection with FIG. 7, each bit from processing element 824 is sent to a 1:4 demultiplexer (not shown) in RLSAs 820. Each demultiplexer selects one of four data cells 804 in the selected row 806 in each group of four bit columns 808 to which the data is to be written.

Figure 9:
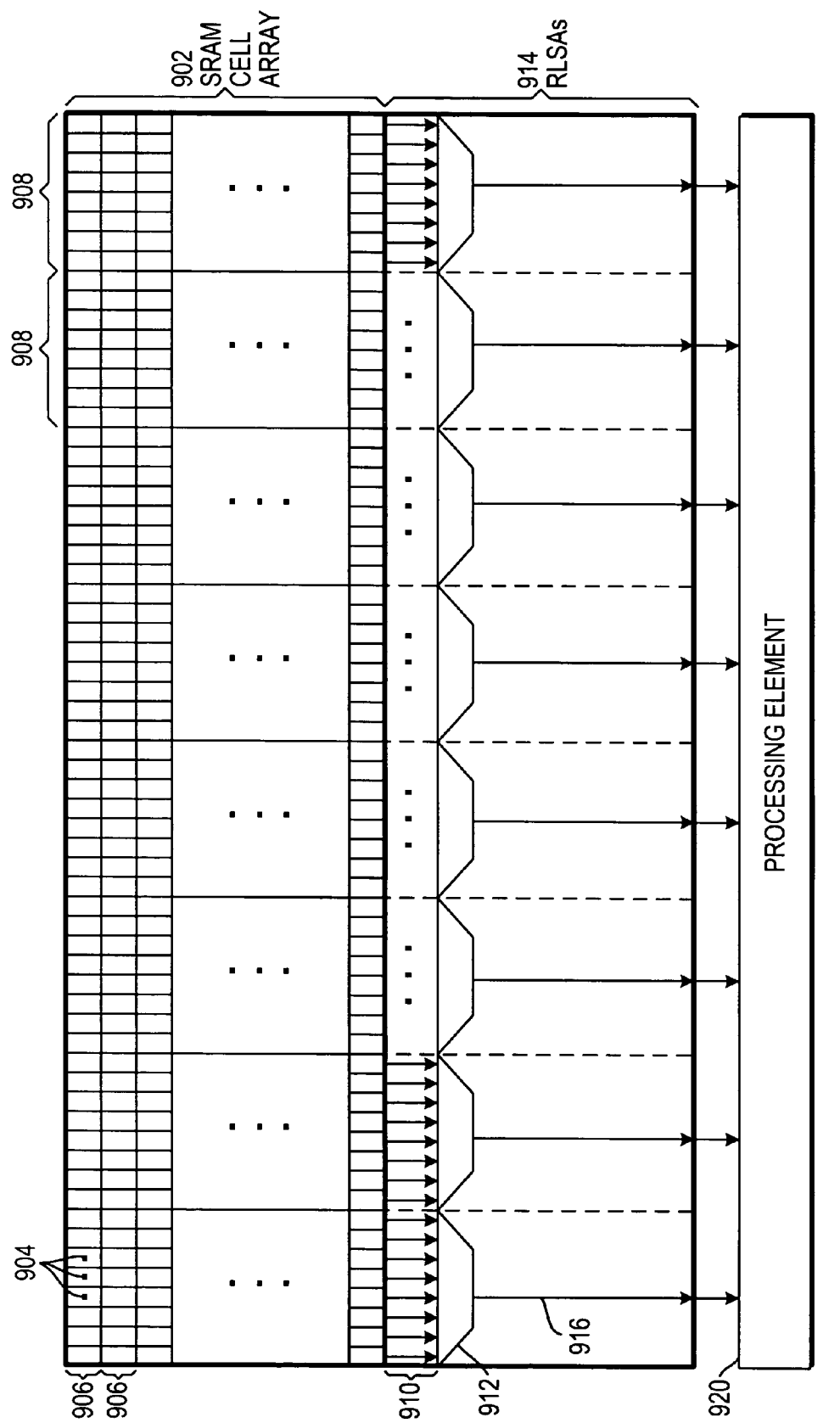
FIG. 9 is a partial diagram illustrating yet another embodiment of an 8-bit wide register file SRAM.

FIG. 9 illustrates an 8-bit wide register file SRAM with a 64-bit wide data column 902. Each group of eight bit columns 908 provides one data bit to processing element 920. Each row 906 contains sixty-four data cells 904. A decoder selects a row 906 from which data is to be read or to which data is to be written. For reads, data in each data cell 904 in the selected row 906 is sent along a bit line 910 to an 8:1 (8 input:1 output) multiplexer 912 in RLSAs 914. A select bit may select one data from each of the inputs of multiplexer 912 to send to output path 916. The data sent to each output path 916 is sent to processing element 920. Similar to writes described in connection with FIGS. 7 and 8, each bit from processing element 920 is sent to a 1:8 demultiplexer (not shown) in RLSAs 914. Each demultiplexer selects one of the eight data cells 904 in the selected row 906 in each group of eight bit columns 908 to which the data is to be written.

There are trade-offs for integrating a SIMD array and a memory onto a single chip. As illustrated in FIGS. 5–9, for full local addressing, each processing element can select a different memory address from which data is to be read or to which data is to be written. A separate register file SRAM 500 (FIG. 5) (i.e, decode logic 502, SRAM cell array 504, and RLSAs 506) is provided for each processing element 508. For example, for a 256-processing-element array, 256-register file SRAMs 500 are needed. Implementing 256 decoders and RLSAs would result in more decode logic and RLSAs than SRAM cell array area. The area and thus cost of providing an SIMD array with full local addressing would be very high.

To minimize the increase in hardware complexity and cost associated with full local addressing, partial local addressing is preferably implemented. For example, instead of allocating a unique register file SRAM (e.g., an 8-bit wide SRAM) to each processing element, multiple processing elements (e.g., 8) can be assigned to a larger register file SRAM (e.g., a 64-bit wide SRAM). Because the decode logic and RLSAs are roughly constant in size in one-dimension regardless of the depth and width of the register file SRAM, this results in less area overhead for the 64-bit wide SRAM compared to its equivalent of eight 8-bit wide SRAMs. For example, for a 256-processing-element array, only 32 (256 PEs/8 PEs per register file SRAM) decoders and RLSAs would be needed to implement partial local addressing compared to the 256 (256 PEs/1 PE per register file SRAM) decoders and RLSAs needed for full local addressing.

Figure 10:
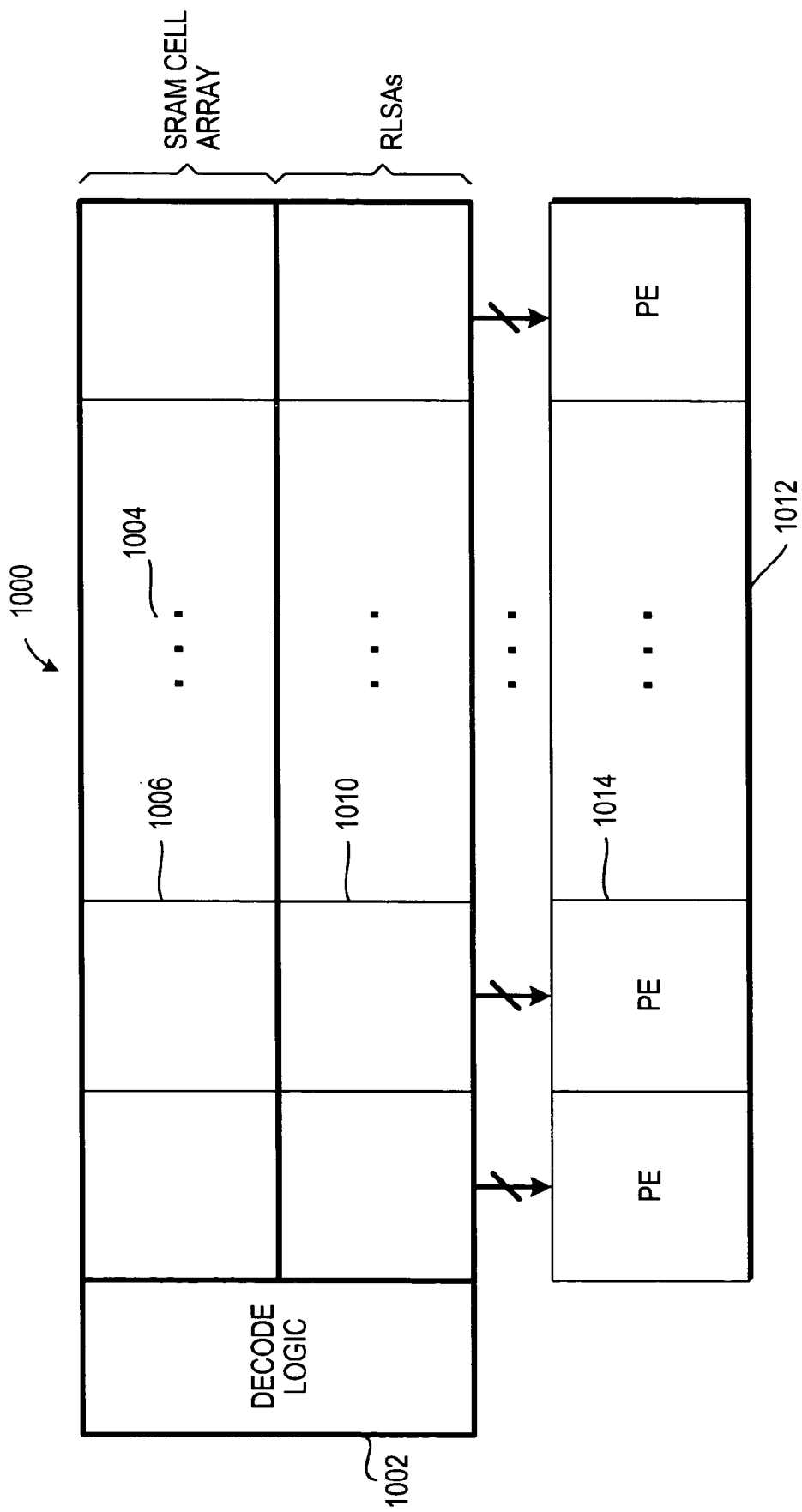
FIG. 10 is a diagram illustrating one embodiment of a register file SRAM dedicated to multiple processing elements.

FIG. 10 illustrates one embodiment of a register file SRAM 1000 dedicated to multiple processing elements 1012. The size of the register file SRAM 1000, the number of associated processing elements 1012, and the number of data bits for each processing element 1014 may vary depending on the power, area, and speed desired. A register file SRAM 1000 dedicated to eight 8-bit wide processing elements 1012 is known as a 64-bit wide register file SRAM. SRAM cell array 1004 may be partitioned into eight data columns 1006, where each data column 1006 (and its corresponding part of RLSAs 1010) is associated with one processing element 1014. Each data column 1006 and corresponding part of RLSAs 1010 may be organized like the SRAM cell array and RLSAs in FIGS. 6–9, or any other suitable arrangement. To perform a read or write, an address is sent to decode logic 1002 to select a row (which is the same row for each data column and pertains to the same register file address) from which data is to be read or to which data is to be written.

Figure 11:
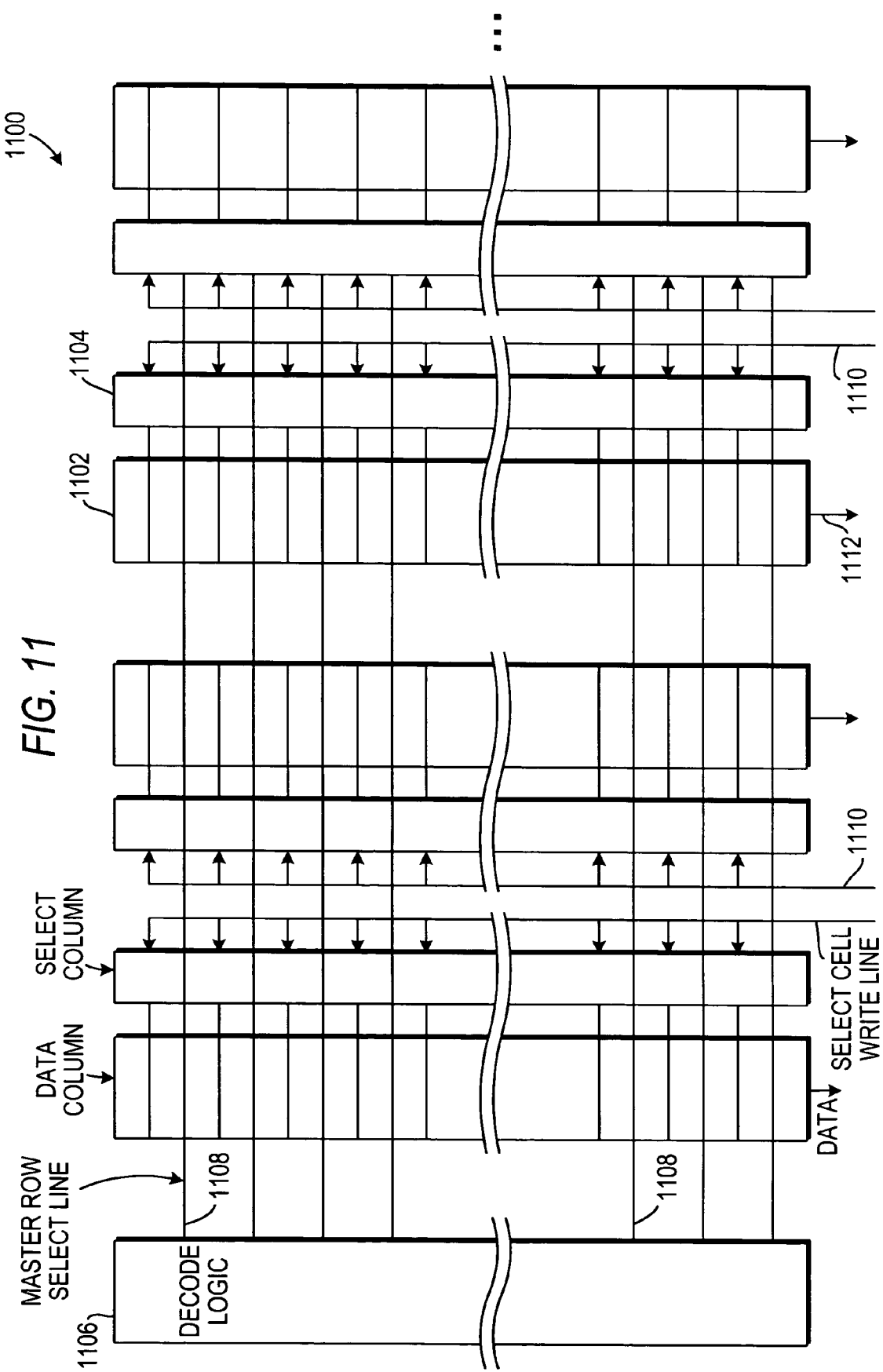
FIG. 11 is a partial diagram illustrating one embodiment of a register file SRAM containing additional SRAM select columns in accordance with the invention.

FIG. 11 is a partial diagram of one embodiment of a register file SRAM 1100 in accordance with the invention. An SRAM cell array may be partitioned into data columns similar to those illustrated in FIGS. 6–9. Each data column 1102, which includes multiple rows and columns of data cells, is associated with one processing element. A select column 1104 or any other suitable storage medium is provided for each data column 1002. Each select column 1104 is typically one bit wide and includes rows of select memory cells, where each select cell corresponds to one row of data cells in a corresponding data column 1102. The number of rows of data cells and select cells is preferably the number of decoder outputs.

There are two inputs to each select cell: a master select line 1108 and a select cell write line 1110. For an SRAM cell array organized into data columns, each master row select line 1108 is coupled to an output of decode logic 1106 (e.g., an address decoder such as a row decoder) and extends across a row of data cells (and corresponding select cell). Each master row select line 1108 corresponds to an address of a particular row of data cells in each data column. Each select cell write line 1110 is coupled to a processing element and extends along a select column 1104 whose associated data column 1102 is allocated to that processing element.

For an SRAM cell array that is organized in data rows, master column select lines are coupled to the output of an address decoder (i.e., column decoder) and extend across columns of data cells (and a corresponding select cell). Each master column select line corresponds to an address of a particular column of data cells in each data row.

For an SRAM cell array that is organized in data blocks (multiple data columns with multiple data rows), two master select lines are needed for each block. Master row select lines are coupled to the output of a first address decoder (i.e., row decoder) and extend across rows of data cells (and a corresponding select cell). Each master row select line corresponds to an address of a particular row of data cells in each data column. Master column select lines are coupled to the output of a second address decoder (i.e., column decoder) and extend across columns of data cells (and a corresponding select cell). Each master column select line corresponds to an address of a particular column of data cells in each data row.

Figure 12:
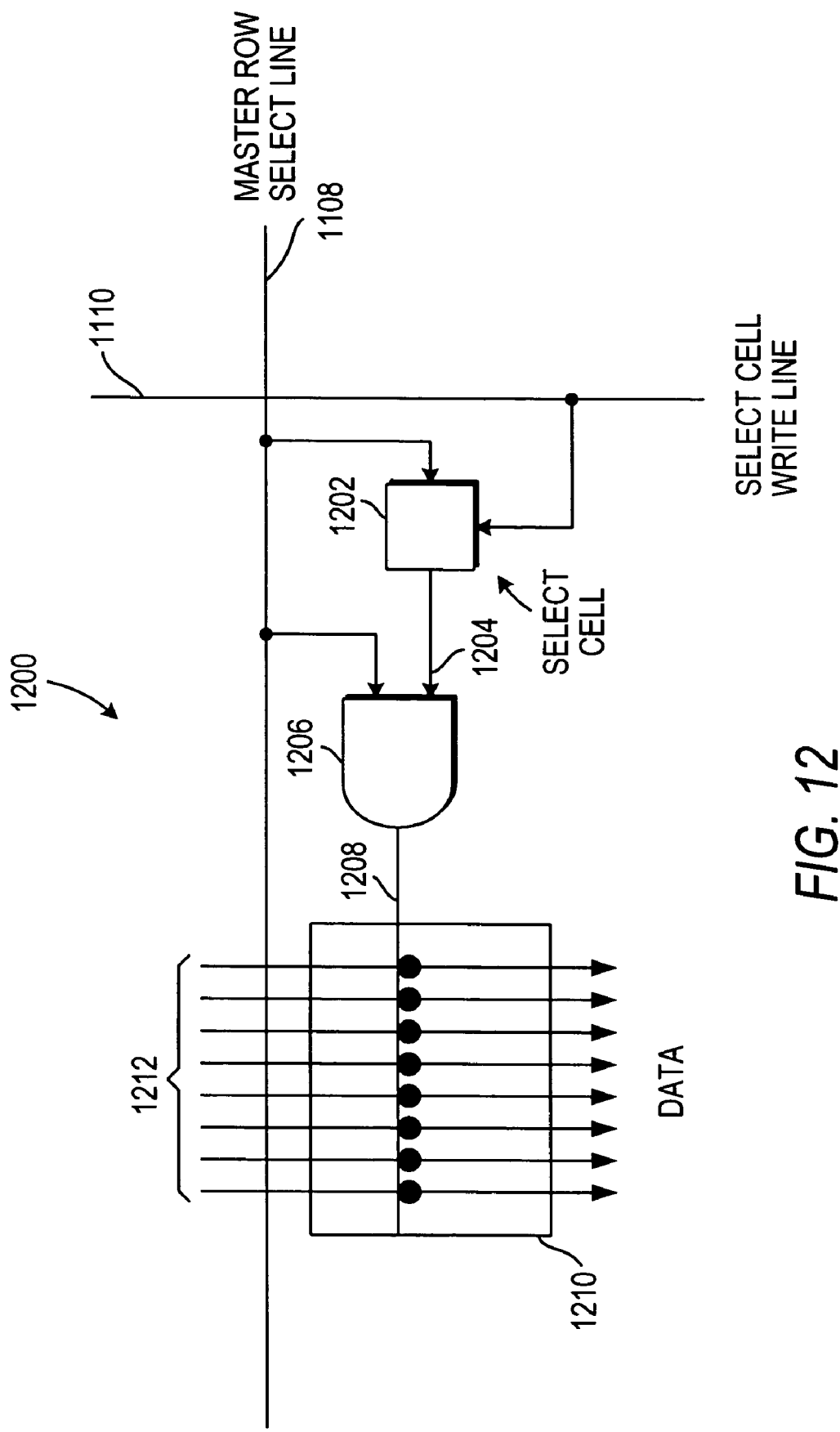
FIG. 12 is a diagram illustrating one embodiment of a row select of the register file SRAM of FIG. 11 in accordance with the invention.

FIG. 12 illustrates one embodiment of a row select 1200 of the register file SRAM of FIG. 11 in accordance with the invention. Select cell 1202, which is part of select column 1104, stores a logic state from a corresponding master row select line 1108 only when a corresponding select cell write line 1110 is set to binary "1." A logic state of binary "1" indicates that the row of data cells has the decoded address while a logic state of binary "0" indicates that the row of data cells has a different address from the decoded address. When select cell write line 1110 is set to binary "0," select cell 1202 does not read the value on master row select line 1108 (the value in the select cell may contain the previous stored value or may contain a null value). Combinatorial logic may be used to perform a logical sum or a logical product on master row select line 1108 and a corresponding output 1204 of select cell 1202. The output of the combinatorial logic is sent along a secondary row select line that extends into a corresponding row of data cells. For example, the output 1204 of select cell 1202 can be coupled to a two-input AND gate 1206. The second input to AND gate 1206 is a master row select line 1108. AND gate 1206 produces an output of "1" only when both inputs are binary "1" (i.e., select cell 1202 is binary "1" and master row select line 1108 is binary "1"), and has an output of binary "0" otherwise. For reads, when the output 1208 of AND gate 1206 is binary "1," data in the selected row in the selected data column 1102 is sent along bit lines 1212 to RLSAs. Depending on the memory organization as described in connection with FIGS. 6–9, the data may be sent to a multiplexer to select the data to send to the processing element. For writes, one data bit from the processing element is written to a data cell in the selected row 1210 in the selected data column 1102.

The invention allows for two modes of addressing: global addressing and local addressing. For memory organized in data columns, in global addressing, data corresponding to each processing element is read from or written to a row of data cells with the same register file address. Read or writes occur on the same row of data cells for each data column. In global addressing, all the selects cells are set to binary "1." Next, an address is decoded and each master row select line is driven with a decoded address bit (only one master row select line is set to binary "1" and all other master row select lines are set to binary "1"). The selected row is the row whose master row select line is binary "1." Data is read from or written to data cells in the selected row.

In local addressing, data corresponding to each processing element can be read from or written to rows of data cells with different register file addresses. Reads or writes can be implemented on the same or different rows of data cells for each data column. Each processing element performing a read or write to the same address sets its corresponding select cell write line to binary "1" (all other processing elements set their select cell write lines to binary "0"). This address is sent to a decoder and the decoded address is driven across the master row select lines. Select columns associated with a select cell write line of binary "1" write each select cell with the value on a corresponding master row select line.

If a second address is available, each processing element associated with that address sets its corresponding select cell write line to binary "1" (all other processing elements set their select cell write lines to binary "0"). This second address is sent to a decoder and the decoded address is driven across the master row select lines. Select cells in a select column associated with a select cell write line of binary "1" are written. This is repeated until an address for each processing element has been decoded and the select cells in each select column have been written. Once each address has been decoded, each master row select line is driven with a binary "1." Only the row of data cells in each data column with a corresponding select cell of binary "1" are selected to perform a read or write.

Figure 13:
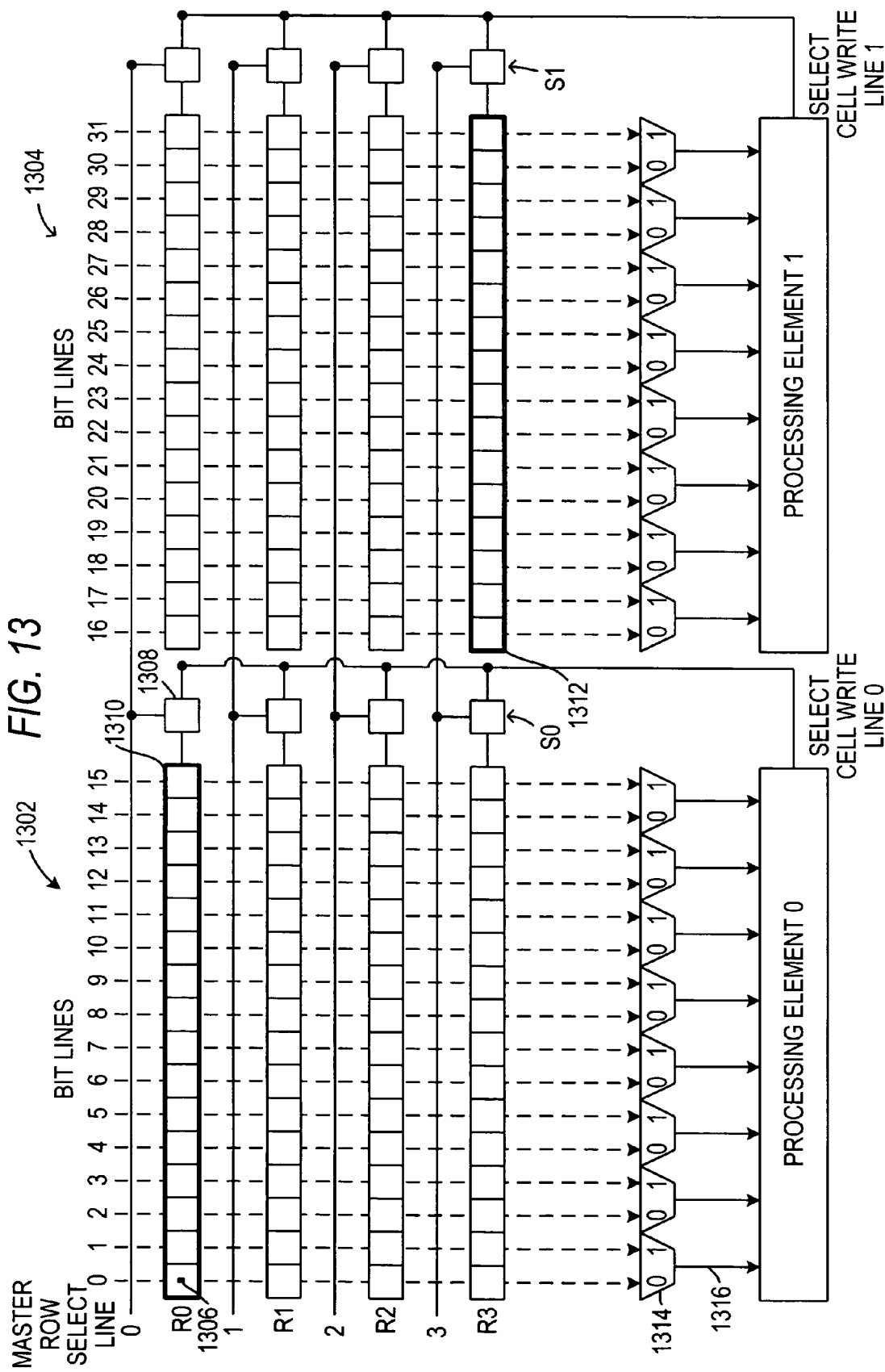
FIG. 13 is a partial diagram of one embodiment of a 4-location register file SRAM connected to two 8-bit processing elements in accordance with the invention.

FIG. 13 illustrates a partial diagram of one embodiment of a 4-location 32-bit wide register file SRAM in accordance with the invention. Two 8-bit wide processing elements have been allocated to the register file SRAM. FIG. 13 is used to illustrate an example of how local addressing can be implemented in accordance with the invention.

The SRAM cell array in FIG. 13 includes two data columns 1302 and 1304. Each data column is sixteen bits wide (16 data cells 1306) and four bits deep (4 data cells 1306). Each data column has four rows of data cells (rows R0, R1, R2, and R3) with an associated select column. Select column S0 (corresponding to processing element) is associated with data column 1302 and select column S1 (corresponding to processing element 1) is associated with data column 1304. Each select column includes rows of select cells 1308 with a corresponding AND gate (not shown to avoid over-complicating the drawing) that corresponds to a row of data cells (as illustrated in FIG. 12). Data column 1302 may be allocated to processing element 0 and data column 1304 may be allocated to processing element 1. Four master row select lines 0–3 extend from a decoder (not shown) across both data columns. For example, master row select line 0 corresponds to a register file address for row R0 (in data columns 1302 and 1304), master row select line 1 corresponds to a register file address for row R1, etc. A select cell write line extends from each processing element to a corresponding select column.

As an illustration of a locally addressed read, suppose that processing element 0 wants to access row R0 in data column 1302 and processing element 1 wants to access row R3 in data column 1304. In a first stage, select column S0 is written. Processing element 0 sets select cell write line 0 to binary "1" and processing element 1 sets select cell write line 1 to binary "0." Processing element 0 sends the register file address for row R0 to a decoder and the decoded address is driven across master row select lines 0–3 (master row select line 0 is set to binary "1" and the remaining master row select lines 1–3 are set to binary "0"). Only the select cells 1308 in S0 are written: the select cell in S0 for R0 is set to binary "1," the select cells in S0 for R1–R3 are set to binary "0."

In a second stage, select column S1 is written. Processing element 1 sets select cell write line 1 to binary "1" and processing element 0 sets select cell write line 0 to binary "0." The register file address for row R3 is sent to a decoder and the decoded address is driven across master row select lines 0–3 (master row select line 3 is set to "1" and the remaining master row select lines 0–2 are set to binary "0"). Only the select cells 1308 in S1 are written: the select cell in S1 for R3 is set to binary "1," the select cells in S1 for R0–R2 are set to binary "0."

If more processing elements are provided with different addresses, then additional stages would be needed to write the select cells associated with the other processing elements. If multiple processing elements access the same register file address, then the processing elements with the same address set their respective select cell write lines to binary "1" and write their select cells in the same stage.

Referring back to the example above, once all the select cells for processing elements 0 and 1 have been written, master row select lines 0–3 are driven with a binary "1." Only the row of data cells in each data column that has a select cell of binary "1" is read. In data column 1302, row R0 (1310) is selected, in data column 1304, row R3 (1312) is selected. The data in each data cell 1306 in the selected row is sent along bit lines 0–31, where one bit line is provided for each individual bit column. Data from each pair of bit lines (e.g., bit lines 0–1, 2–3, . . . 16–17, 18–19, . . .) is sent to a 2:1 multiplexer 1314. In this example, data from even numbered bit lines (e.g., 0, 2, 4, . . .) may correspond to a first input while data from odd numbered bit lines (e.g., 1, 3, 5, . . .) may correspond to a second input. A select bit may select which input in each multiplexer 1314 to sent to output path 1316. For example, the select bit may indicate the multiplexer to select all inputs associated with even numbered bit lines. The selected output associated with data column 1302 is sent to processing element 0 while the selected output associated with data column 1304 is sent to processing element. For writes, the process of selecting the row in each data column is the same as for reads. Rather than a multiplexer, a demultiplexer may be used to select the data cell from which data is to be written.

In one embodiment of the invention, successive reads or writes may occur. When more than one individual column of data cells is provided for each bit of a processing element, an offset may be provided that allows successive reads or writes from data cells within the same row. For example, referring back to the example in FIG. 13, row R0 for data column 1302 may be selected and a select bit may indicate to multiplexer 1314 to read the bits provided on the even bit lines (e.g., 0, 2, . . .). An offset may be added to the select bit so that multiplexer 1314 may read bits from a next location in memory (e.g., bits provided on the odd bit lines (e.g., 1, 3, . . .)). For several individual bit columns associated with one bit of a processing element, the offset does not have to index immediately successive memory locations but may index every predetermined (e.g., every 2, every 3, etc.) number of memory locations for data cells in the same row. This allows faster reads without having to decode the same input address multiple times. One example of when successive reads may be performed is if a processing element is performing an add operation and needs to read two 8-bit values from successive memory locations.

Once local addressing is complete, all the select cells 1308 are reset to binary "1" to allow global addressing. An address is presented to the decoder and the master row select lines are driven with the decoded address. Only one row of data cells (e.g., row R0) is accessed, which provides data for processing elements 0 and 1. As with local addressing, global addressing may also allow successive memory reads and writes.

Figure 14:
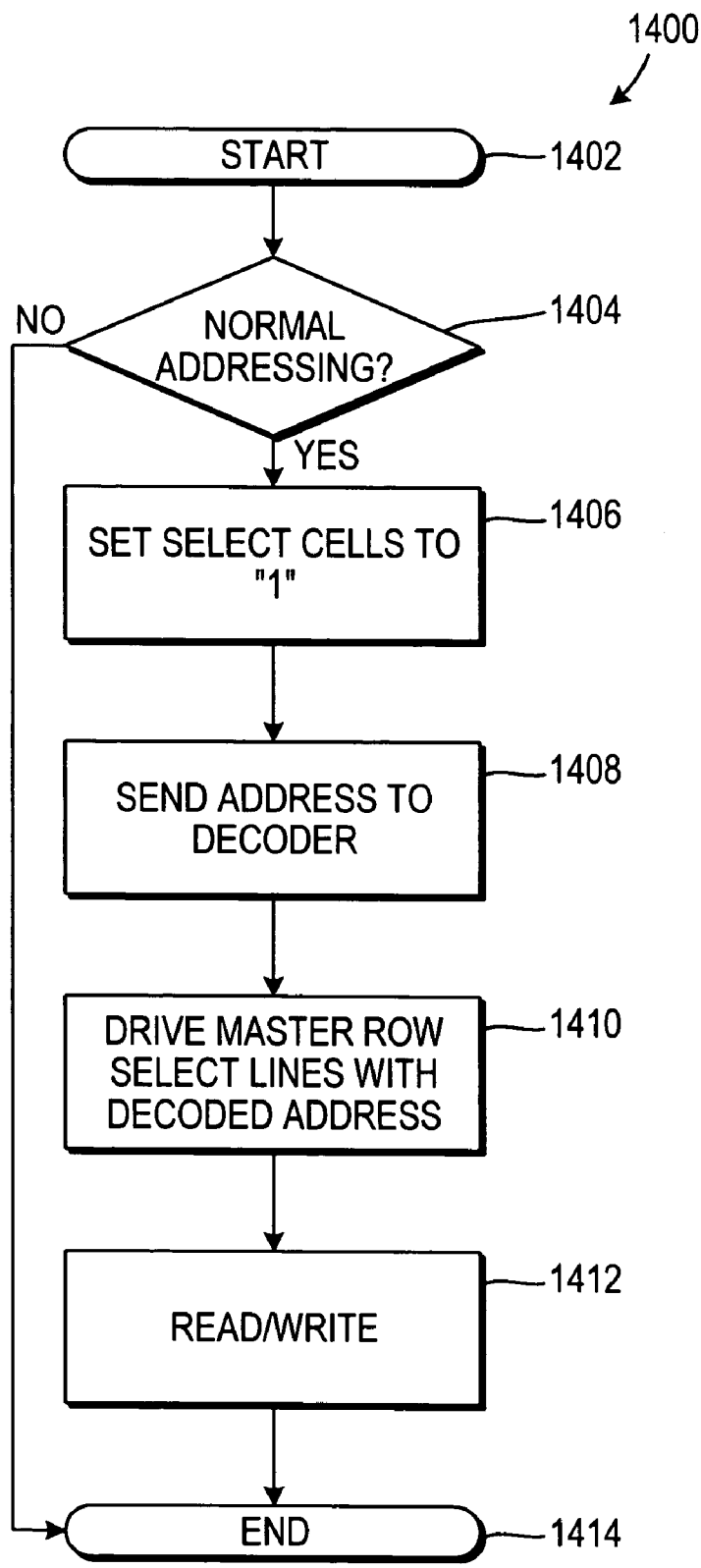
FIG. 14 is flow chart of one embodiment of a process for implementing global addressing in accordance with the invention.

FIG. 14 is a flow diagram of one embodiment of a process 1400 for implementing global addressing in accordance with the invention. Process 1400 begins at step 1402 in local addressing mode. At step 1404, process 1400 determines whether global addressing is to be implemented. If process 1400 is to remain in local addressing mode, process 1400 ends at step 1414. If process 1400 is to return to global addressing mode, process 1400 moves to step 1406 where all the select cells are set to binary "1." Next, an address is sent to a decoder at step 1408. The master row select lines are driven with the decoded address at step 1410, which selects the row of data cells from which data is to be read or to which data is to be written. At step 1412, data is read from the selected data cells or written to the selected data cells and the process ends at step 144. Although not shown, successive memory reads and writes may also occur.

Figure 15:
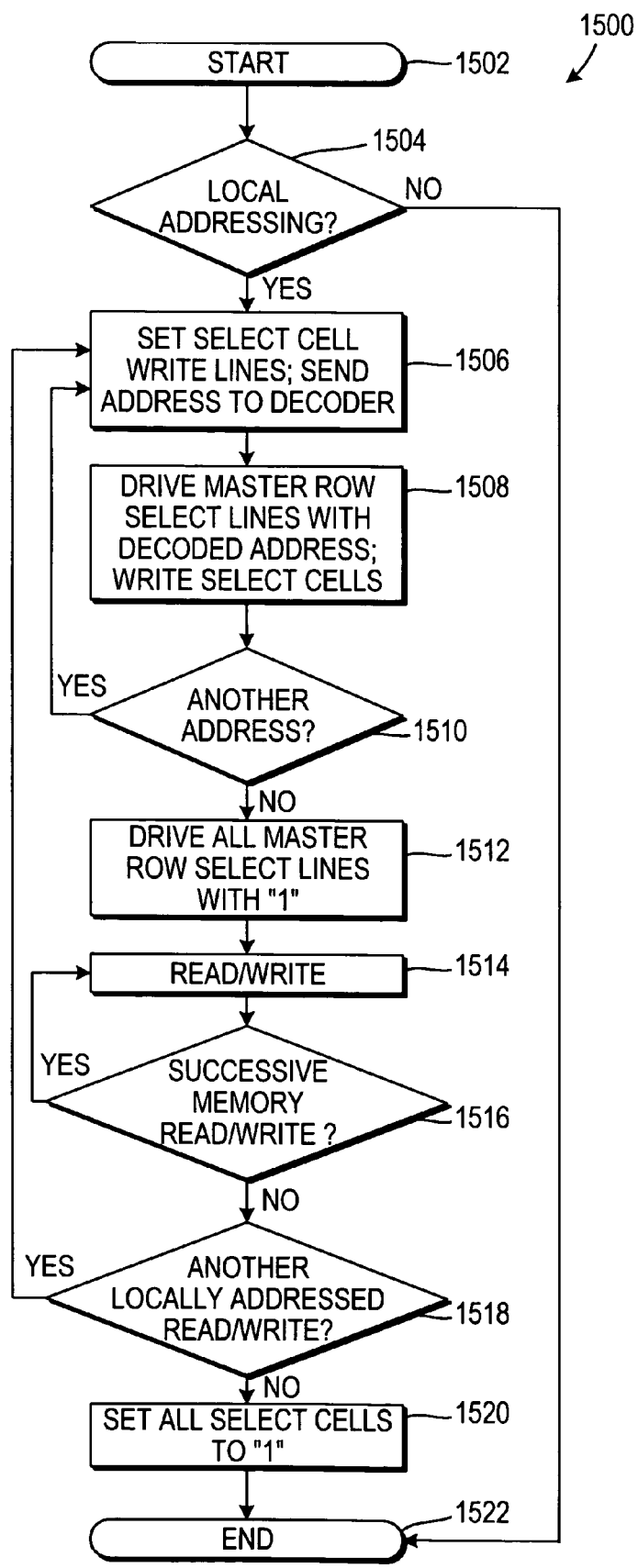
FIG. 15 is a flow diagram of one embodiment of a process of reading data from, or writing data to, a locally addressed register file SRAM in accordance with the invention.

FIG. 15 is a flow diagram of one embodiment of a process 1500 for implementing local addressing in accordance with the invention. Process 1500 begins at step 1502 in global addressing mode. At step 1504, process 1500 determines whether local addressing is to be implemented. If process 1500 is to remain in global addressing mode, process 1500 ends at step 1522. If process 1500 is to implement local addressing, process 1500 moves to step 1506 where the select cell write lines are set and an address is sent to a decoder. Processing elements that read from or write to the address drive a corresponding select cell write line to binary "1," while other select cell write lines are driven with a binary "0." At step 1508, the master row select lines are driven with the decoded address and the select cells associated with a select cell write line of "1" are written.

At step 1510, process 1500 determines whether another address is available for a different processing element. If another address is provided, process 1500 returns to step 1506. If another address is not available (select cells for all processing elements have been written), process 1500 moves to step 1512 where all the master row select lines are driven with a binary "1." At step 1514, process 1500 reads data from the selected row in each data column or writes data to the selected row in each data column. At step 1516, process 1500 determines whether a successive memory read or write is to be performed. If a successive memory read or write is to be performed, an offset is added to the select bit of the multiplexer and process 1500 returns to step 1514. If there is no successive memory read or write, process 1500 moves to step 1518 where process 1500 determines whether another locally addressed read or write is to be performed. If another locally address read or write is to be performed, process 1500 returns to step 1506. If the locally addressed read or write is completed, process 1500 resumes normal operation by setting all select cells to binary "1" at step 1520. Process 1500 then ends at step 1522.

This approach to local addressing in register file SRAM results in little or no area overhead compared to a register file SRAM without local addressing. Because the SRAMs for the processing element register files have separate byte write enables, there is already a degree of byte-wise organization in them. The addition of an extra bit column to each data column adds some area overhead to the register file SRAM. However, compared to known addressing methods, this approach only increases the total area by a small amount. The additional degree of buffering provided may reduce the area of the decoder by a small amount.

The increase in area may be further reduced. Because the SIMD array and memory are usually integrated onto a single chip using a layout design (a circuit design process that creates circuit components and interconnections in software and then fabricates the circuit onto a wafer), and because the SIMD array needs to be pitch matched (a method of layout that minimizes wire routing between components) to the DRAM, the layout of the processing element array typically contains extra space between bytes. Thus, it may be possible to add the additional select columns and logic within the extra spaces, resulting in little or no area overhead.

The use of partial local addressing for a register file SRAM in accordance with the invention has several useful applications. For example, this approach may be useful for programs that require a succession of accesses to a wide memory. The accesses can be for the same byte or word, or for different bytes or words. The accesses may be made successively by memory address or in a different order. Another application may be to reorder data in input/output systems. This approach can provide a convenient and quick approach to writing data to different locations.

Thus it is seen that an register file SRAM for local addressing in a SIMD array improves performance with little or no added area overhead. One skilled in the art will appreciate that the invention can be practiced by other than the described embodiments, which are presented for purposes of illustration and not of limitation, and the invention is limited only by the claims which follow.

What is claimed is:

1. For use in a memory with global addressing and local addressing, wherein said global addressing allows a plurality of processing elements to read data from or to write data to a location in said memory and said local addressing allows said plurality of processing elements to read data from or to write data to different locations in said memory, apparatus for providing said local addressing comprising:

a decoder comprising:
n inputs coupled to receive one bit each of an address from which data is to be read or to which data is to be written, and
$2^n$ outputs;
a plurality of select columns in said memory, wherein each of said plurality of select columns comprises a plurality of select cells, wherein each of said plurality of select cells comprises:
a first input coupled to receive one of said $2^n$ outputs of said decoder via a master row select line,
a second input coupled to receive a value from a select cell write line, and
an output;
a plurality of AND gates, wherein each of said plurality of AND gates comprises:
a first input coupled to receive an output of a select cell,
a second input coupled to receive a value from a corresponding master row select line, and
an output; and a plurality of data columns in said memory, wherein each of said plurality of data columns comprises a plurality of rows of data cells, each row of data cells corresponds to one select cell and each row of data cells comprises:
   an input coupled to receive an output of a corresponding AND gate, and
   a data path from which data is to be read or to which data is to be written.

2. The apparatus of claim 1 wherein said memory is a static random access memory.

3. The apparatus of claim 1 wherein each of said plurality of data columns provides data to one of said plurality of processing elements.

4. The apparatus of claim 1 comprising a number of select cells in each of said plurality of select columns and a number of AND gates equal to a number of rows of data cells in each of said plurality of data columns.

5. The apparatus of claim 4 wherein said number of rows of data cells in each of said plurality of data columns is 2n.

6. The apparatus of claim 1 wherein one of said plurality of processing elements provides said decoder with said address.

7. The apparatus of claim 1 wherein said decoder maps one input address to one output, wherein each unique input address corresponds to a unique output.

8. The apparatus of claim 7 wherein said decoder that maps one input address to one output further:
   sends a binary "1" to said one output; and
   sends a binary "0" to each output other than said one output.

9. The apparatus of claim 1 wherein each of said $2^n$ outputs of said decoder is coupled to a master row select line that extends to a select cell in each of said plurality of select columns, wherein each of said $2^n$ outputs corresponds to an address of a row of data cells in each of said plurality of data columns to which a corresponding master row select line is provided.

10. The apparatus of claim 9 wherein said decoder drives each master row select line with a decoded address bit.

11. The apparatus of claim 1 wherein said second input of each select cell in a select column is activated by a processing element associated with a corresponding data column when said processing element is to read data from or to write data to said address.

12. The apparatus of claim 1 wherein said select cell write line that is coupled to said second input of each select cell in a select column is deactivated by a processing element associated with a corresponding data column when said processing element is to read data from or to write data to a different address from said address.

13. The apparatus of claim 1 wherein said output of each select cell is set to said first input when said second input is binary "1."

14. The apparatus of claim 1 wherein said output of each AND gate is set to binary "1" when said first input and said second input are binary "1," and set to binary "0" when at least one of said first input and second input is binary "0."

15. The apparatus of claim 1 wherein each of said plurality of select cells in each of said plurality of select columns is reset to binary "1" to resume said global addressing, wherein said global addressing operates to read data from or to write data to a row of data cells in each of said plurality of data columns when said second input from a corresponding AND gate is binary "1."

16. The apparatus of claim 15 further comprising deactivating each select cell write line corresponding to each of said plurality of select columns.

17. The apparatus of claim 1 further comprising read logic and sense amplifiers, wherein said read logic and sense amplifiers perform one of:
   reading data from a row of data cells that corresponds to a select cell whose value is binary "1;" and
   writing data to said row of data cells that corresponds to said select cell whose value is binary "1."

18. The apparatus of claim 17 wherein said read logic and sense amplifiers that read data also send data in said row of data cells in each of said plurality of data columns to at least one multiplexer and select a bit from said data from each multiplexer to be read.

19. The apparatus of claim 18 wherein said read logic and sense amplifiers further select a different bit from said data from each multiplexer to be read.

20. The apparatus of claim 17 wherein said read logic and sense amplifiers that write data also receive data from each of said plurality of processing elements and select from each demultiplexer a data cell for one bit of said data in said row of data cells in each of said plurality of data columns to be written.

21. The apparatus of claim 20 wherein said read logic and sense amplifiers further receive different data from each of said plurality of processing elements and select from each demultiplexer a different data cell for one bit said different data in said row of data cells in each of said plurality of data columns to be written.

22. The apparatus of claim 1 wherein said apparatus is integrated with a main memory onto a single chip using a layout design.

23. The apparatus of claim 22 wherein said main memory is dynamic random access memory.

24. The apparatus of claim 22 wherein said plurality of select columns, said plurality of AND gates, and corresponding input and output lines are added to said layout design in extra spaces in a layout of said decoder, said plurality of data columns, and said plurality of processing elements.

25. For use in a memory with global addressing and local addressing, wherein said global addressing allows a plurality of processing elements to read data from or to write data to a location in said memory and said local addressing allows said plurality of processing elements to read data from or to write data to different locations in said memory, apparatus for providing said local addressing comprising:
   a register file memory, wherein said register file memory allows each of said plurality of processing elements to read data from or to write data to a different address in said register file memory;
   a control logic sequencer, wherein said control logic sequencer controls data flow;
   an interconnect, wherein said interconnect allows data flow between said plurality of processing elements; and
   a memory buffer register, wherein said memory buffer register stores data from said plurality of processing elements to send to a main memory and stores data from said main memory to send to said plurality of processing elements.

26. The apparatus of claim 25 wherein said register file memory is a static random access memory.

27. The apparatus of claim 25 wherein said register file memory comprises:
   a decoder comprising:
      n inputs coupled to receive one bit each of an address from which data is to be read or to which data is to be written, and
      $2^n$ outputs;
   a plurality of select columns in said memory, wherein each of said plurality of select columns comprises a plurality of select cells, each select cell comprising:
      a first input coupled to receive one of said $2^n$ outputs of said decoder via a master row select line,
      a second input coupled to receive a value from a select cell write line, and an output;
a plurality of AND gates, wherein each of said plurality of AND gates comprises:
a first input coupled to receive an output of a select cell,
a second input coupled to receive a value from a corresponding master row select line, and
an output; and
a plurality of data columns in said memory, wherein each of said plurality of data columns comprises a plurality of rows of data cells, each row of data cells corresponds to one select cell and each row of data cells comprises:
an input coupled to receive an output of a corresponding AND gate, and
a data path from which data is be read or to which data is to be written.

28. The apparatus of claim 27 wherein each of said plurality of data columns provides data to one of said plurality of processing elements.

29. The apparatus of claim 27 comprising a number of select cells in each of said plurality of select columns and a number of AND gates equal to a number of rows of data cells in each of said plurality of data columns.

30. The apparatus of claim 29 wherein said number of rows of data cells in each of said plurality of data columns is $2^n$.

31. The apparatus of claim 27 wherein said decoder maps one input address to one output, wherein each unique input address corresponds to a unique output.

32. The apparatus of claim 31 wherein said decoder that maps one input address to one output further:
sends a binary "1" to said one output; and
sends a binary "0" to each output other than said one output.

33. The apparatus of claim 27 wherein each of said $2^n$ outputs of said decoder is coupled to a master row select line that extends to a select cell in each of said plurality of select columns, wherein each of said $2^n$ outputs corresponds to an address of a row of data cells in each of said plurality of data columns to which a corresponding master row select line is provided.

34. The apparatus of claim 27 wherein said output of each select cell is set to said first input when said second input is binary "1."

35. The apparatus of claim 27 wherein said output of each AND gate is set to binary "1" when said first input and said second input are binary "1," and set to binary "0" when at least one of said first input and second input is binary "0."

36. The apparatus of claim 27 wherein each of said plurality of select cells in each of said plurality of select columns is reset to binary "1" to resume said global addressing, wherein said global addressing operates to read data from or to write data to a row of data cells in each of said plurality of data columns when said second input from a corresponding AND gate is binary "1."

37. The apparatus of claim 27 further comprising read logic and sense amplifiers, wherein said read logic and sense amplifiers perform one of:
reading data from a row of data cells that corresponds to a select cell whose value is binary "1;" and
writing data to said row of data cells that corresponds to said select cell whose value is binary "1."

38. The apparatus of claim 37 wherein said read logic and sense amplifiers that read data also send data in said row of data cells in each of said plurality of data columns to at least one multiplexer and select a bit from said data from each multiplexer to be read.

39. The apparatus of claim 38 wherein said read logic and sense amplifiers further select a different bit from said data from each multiplexer to be read.

40. The apparatus of claim 37 wherein said read logic and sense amplifiers that write data also receive data from each of said plurality of processing elements and select from each demultiplexer a data cell for one bit of said data in said row of data cells in each of said plurality of data columns to be written.

41. The apparatus of claim 40 wherein said read logic and sense amplifiers further receive different data from each of said plurality of processing elements and select from each demultiplexer a different data cell for one bit of said different data in said row of data cells in each of said plurality of data columns to be written.

42. The apparatus of claim 27 wherein said register file memory, said control logic sequencer, said interconnect, and said memory buffer register are integrated with said main memory onto a single chip using a layout design.

43. The apparatus of claim 42 wherein said plurality of select columns, said plurality of AND gates, and corresponding input and output lines are added to said layout design in extra spaces in a layout of remaining components of said register file memory, said control logic sequencer, said interconnect, and said memory buffer register.

44. The apparatus of claim 25 wherein each of said plurality of processing elements performs one of reading eight data bits from and writing eight data bits to said register file memory.

45. The apparatus of claim 25 wherein each of said plurality of processing elements processes a same instruction concurrently on data from said register file memory.

46. The apparatus of claim 25 wherein said control logic sequencer also generates an address in said register file memory from which data is to be read or to which data is to be written for each of said plurality of processing elements.

47. The apparatus of claim 25 wherein said control logic sequencer directs processing of data in said plurality of processing elements.

48. The apparatus of claim 25 wherein said control logic sequencer also directs loading of data from each of said plurality of processing elements onto said interconnect and from said interconnect to each of said plurality of processing elements concurrently.

49. The apparatus of claim 25 wherein said control logic sequencer also directs loading of data from each of said plurality of processing elements to said memory buffer registers and from said memory buffer registers to each of said plurality of processing elements.

50. The apparatus of claim 25 wherein said control logic sequencer also directs loading of data from said main memory to said memory buffer registers and from said memory buffer registers to said main memory.

51. The apparatus of claim 25 wherein said interconnect comprises a plurality of interconnect cells, wherein each of said plurality of interconnect cell couples two neighboring processing elements.

52. The apparatus of claim 25 further comprising a plurality of data paths, wherein each of said plurality of data paths allows data flow between said memory buffer register and a block of said main memory.

53. The apparatus of claim 52 wherein said block of said main memory corresponds to one of said plurality of processing elements.

54. The apparatus of claim 25 wherein said main memory is a dynamic random access memory.

* * * * *